US012712942B2

(12) United States Patent
Ambat et al.

(10) Patent No.: US 12,712,942 B2
(45) Date of Patent: Aug. 18, 2026

(54) MULTI-CLOUD PLATFORM DATA MOBILITY GROUP SYSTEM AND METHOD

(71) Applicant: Dell Products L.P., Round Rock, TX (US)

(72) Inventors: Gopakumar Ambat, Bangalore (IN); Nagasimha G. Haravu, Chapel Hill, NC (US); Peter A Bouchard, Rehoboth, MA (US)

(73) Assignee: Dell Products L.P., Round Rock, TX (US)

(*) Notice: Subject to any disclaimer, the term of this patent is extended or adjusted under 35 U.S.C. 154(b) by 142 days.

(21) Appl. No.: 18/422,032

(22) Filed: Jan. 25, 2024

(65) Prior Publication Data

US 2025/0247445 A1 Jul. 31, 2025

(51) Int. Cl.
*H04L 67/1095* (2022.01)
*H04L 67/1097* (2022.01)

(52) U.S. Cl.
CPC ...... *H04L 67/1095* (2013.01); *H04L 67/1097* (2013.01)

(58) Field of Classification Search
None
See application file for complete search history.

(56) References Cited

U.S. PATENT DOCUMENTS

| | | | | |
|---|---|---|---|---|
| 10,942,665 | B2 * | 3/2021 | Carrell | G06F 3/065 |
| 2005/0283564 | A1 * | 12/2005 | LeCrone | G06F 3/0646 711/100 |
| 2021/0004332 | A1 * | 1/2021 | Geri | G06F 12/0815 |
| 2021/0342785 | A1 * | 11/2021 | Mann | G06F 40/18 |
| 2025/0238285 | A1 * | 7/2025 | Gracia-Tinedo | G06F 9/52 |

OTHER PUBLICATIONS

Pandey et al., "A Survey of Storage Remote Replication Software", Dec. 1, 2014, IEEE, 2014 3rd International Conference on Eco-friendly Computing and Communication Systems (2014, pp. 45-50) (Year: 2014).*

* cited by examiner

*Primary Examiner* — Davoud A Zand
(74) *Attorney, Agent, or Firm* — Fogarty LLP

(57) ABSTRACT

Systems and methods for data mobility in multi-cloud platforms that orchestrates multiple storage objects using mobility groups. According to one embodiment, an Information Handling System (IHS) includes a multi-cloud platform that includes first and second clouds each supported by first and second servers, respectively. The IHS also includes computer-executable instructions to receive a request to copy data consumed by an application from a first server to a second server, determine one or more source storage objects on the first server that stores the data, and generate a mobility group that includes information associated with a first location of the source storage objects and a second location of the second server. The instructions may use the mobility group to copy the storage objects from the first server to the second server according to the information included in the mobility group.

19 Claims, 5 Drawing Sheets

400

```
{
 "ID": "1234",
 "NAME": "APPLICATION XYZ GROUP",
 "CREATION_TIMESTAMP": "10122020T01:02:03.456Z",
 "MEMBERS":[ {
   "ID": "POWERFLEX-LUN-1000",
   "NAME": "VOLUME_123",
   "SIZE": "102400"
  },
  {
   "ID": "POWERSCALE-DIR-3000",
   "NAME": "APPDIR",
   "PATH": "/DIR1/DIR2/DIR3",
   "SIZE": "1024000"
  } ]
}
```

FIG. 4

MULTI-CLOUD PLATFORM DATA MOBILITY GROUP SYSTEM AND METHOD

BACKGROUND

As the value and use of information continues to increase, individuals and businesses seek additional ways to process and store it. One option available to users is an Information Handling System (IHS). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated.

IHSs may be general or configured for a specific user or specific use, such as financial transaction processing, airline reservations, enterprise data storage, or global communications. In addition, IHSs may include a variety of hardware and software components that may be configured to process, store, and communicate information and may include one or more computer systems, data storage systems, and networking systems.

Many computer processing architectures have recently migrated toward cloud computing. Cloud computing generally involves the delivery of computing services over the Internet. Whereas on-premises computing solutions can refer to in-house hosted software (e.g., on local servers, private clouds, etc.) that may be supported by a third party vendor or provider, cloud computing solutions may refer to software that is hosted and maintained by the same vendor. With cloud computing, a virtualized pool of resources, from raw compute power at the infrastructure level to application functionality, is often made available to a client, on demand, by a provider. One particular advantage of cloud computing is the ability to apply abstracted versions of compute, storage, and network resources to workloads, as needed, and tap into an abundance of prebuilt services. Cloud computing may enable users to tap into additional capabilities without requiring the investment of the infrastructure, such as new hardware or software. Rather, users often pay the provider of the cloud service a subscription fee or in cases lease the infrastructure that they use.

Multi-cloud computing refers to the use of two or more clouds from different cloud providers. This may include any mix of Infrastructure, Platform, or Software as a Service (IaaS, PaaS, or SaaS). Multi-cloud computing may be used to address specific business requirements or to avoid the limitations of a single-vendor cloud strategy. For example, the use of cloud services and computing resources for business that depends on a single cloud has caused various problems, such as a risk of service interruption of the single cloud. The multi-cloud platform may include cloud networks or cloud hosting environments provided by different cloud service providers. In the multi-cloud platform, the cloud networks may be managed by a multi-cloud management platform. The multi-cloud management platform includes hardware, software, firmware, or a combination thereof which provides a unified interface for deployment, provisioning, and monitoring of different cloud networks in the multi-cloud platform.

SUMMARY

Systems and methods for data mobility in multi-cloud platforms that orchestrates multiple storage objects using mobility groups. According to one embodiment, an Information Handling System (IHS) includes a multi-cloud platform that includes first and second clouds each supported by first and second servers, respectively. The IHS also includes computer-executable instructions to receive a request to copy data consumed by an application from a first server to a second server, determine one or more source storage objects on the first server that stores the data, and generate a mobility group that includes information associated with a first location of the source storage objects and a second location of the second server. The instructions may use the mobility group to copy the storage objects from the first server to the second server according to the information included in the mobility group.

According to another embodiment, a data mobility grouping method includes the steps of receiving a request to copy data consumed by an application from a first server to a second server of a multi-cloud platform, determining one or more source storage objects on the first server that stores the data, generating a mobility group that includes information associated with a first location of the source storage objects and a second location of the second server, and copying the storage objects from the first server to the second server according to the information included in the mobility group.

According to yet another embodiment, a computer program product includes a non-transitory computer readable storage medium having program instructions stored thereon that, upon execution by an IHS, cause the IHS to receive a request to copy data consumed by an application from a first server to a second server of a multi-cloud platform, determine one or more source storage objects on the first server that stores the data, generate a mobility group that includes information associated with a first location of the source storage objects and a second location of the second server, and copy the storage objects from the first server to the second server according to the information included in the mobility group.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

FIG. 4 illustrates an example mobility group representation that may be generated by the multi-cloud management tool according to one embodiment of the present disclosure.

DETAILED DESCRIPTION

Figure 1:
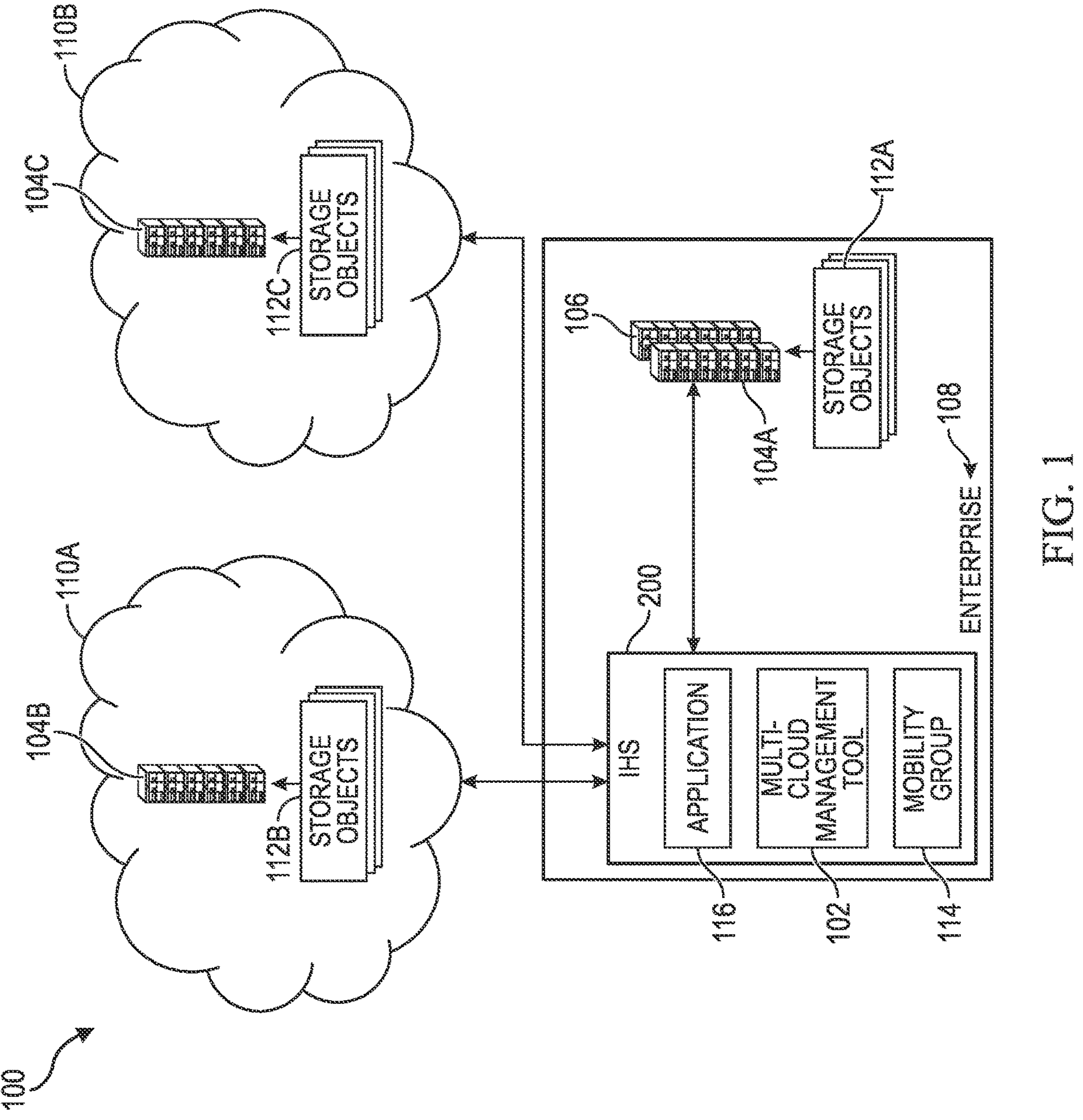
FIG. 1 illustrates an example data mobility grouping system that orchestrates multiple storage objects using mobility groups according to one embodiment of the present disclosure.

The present disclosure is described with reference to the attached figures. The figures are not drawn to scale, and they are provided merely to illustrate the disclosure. Several aspects of the disclosure are described below with reference to example applications for illustration. It should be understood that numerous specific details, relationships, and methods are set forth to provide an understanding of the disclosure. The present disclosure is not limited by the illustrated ordering of acts or events, as some acts may occur in different orders and/or concurrently with other acts or events. Furthermore, not all illustrated acts or events are required to implement a methodology in accordance with the present disclosure.

Cloud computing generally refers to the delivery of computing resources, especially data storage and computing power, over the Internet without direct active management by the user. The term is generally used to describe data centers available to many users on a pay-for-use basis. As an increasing number of software applications are moving to the cloud and are being developed for the cloud, users are adopting a variety of cloud deployment models. These range from private clouds to public clouds, to a mix of both (i.e., hybrid clouds).

Multi-cloud computing generally refers to the use of at least two or more cloud environments at the same time, and may also refer to the use of two or more clouds from different cloud providers. This may include any mix of Infrastructure, Platform, or Software as a Service (IaaS, PaaS, or SaaS). The term "cloud platform" may be used herein to refer to a configuration of distributed storage and/or computing services that may be publicly offered by providers over the Internet. Examples for such cloud platforms may include Amazon Web Services (AWS), Microsoft Azure, and Google Cloud Platform (GCP).

Computing vendors are working on the delivery of systems that allow customers to easily leverage various storage offerings across today's available computing environments. One goal is to provide customer with the options to run storage offerings with various public cloud providers and provide a platform that allows for those systems to be managed centrally while also available to the rest of the enterprise environment for workflows and data/application mobility. In particular, it would be beneficial for vendors of cloud computing resources to scale access to cloud computing platform accounts outside the purview or control of the cloud platform's control mechanisms.

Multi-cloud management tools have been developed to address the need of providing a multi-cloud platform for users. As these tools start supporting different storage endpoints across different storage types (e.g., block storage, file storage, object storage, etc.) and heterogeneous storage systems, it has become increasingly challenging to organize the mobility related business logic across all these diverse systems. IHS vendors have developed storage systems that are optimized for different purposes thus yielding different procedures or processes for handling data mobility. For example, DELL TECHNOLOGIES has developed a POWERSTORE line of storage systems that is optimized for scalable block and file capabilities, a POWERMAX line optimized for reliability, a POWERSCALE line that includes object storage support, and a POWERFLEX line that provides software-defined storage.

Enterprise users today are increasingly relying on storage endpoints in the cloud to leverage the efficiencies of cloud native applications to meet their test, development, and/or analytics workloads. With on-premises physical storage systems handling day-to-day production data, there is a need to securely and reliably move data between an on-premises data center and a storage endpoint in the cloud. Many data movement orchestration engines available today expose the semantics of the underlying data transfer protocol and storage object type (e.g., block storage, file storage, object storage, etc.) to the end user and, in that process, the internal details of the storage endpoint get exposed as well. With a multitude of on-premises storage endpoints, supporting various storage object types involved in data mobility to a multi-cloud environment, customers need a simplified and storage agnostic representation of the data whose mobility they are orchestrating.

FIG. 1 illustrates an example data mobility grouping system 100 that orchestrates multiple storage objects using mobility groups according to one embodiment of the present disclosure. The data mobility grouping system 100 includes a multi-cloud management tool 102 configured to manage the operation of servers 104*a-c* (collectively 104) configured in an operational data center 106 of an enterprise 108 or in remote clouds 110*a-b* (collectively 110). The data center 106 and computing clouds 110 may collectively be referred to as a multi-cloud platform that can be used to store data in the form of storage objects 112*a-c* (collectively 112) for an application 116. According to embodiments of the present disclosure, the multi-cloud management tool 102 creates and manages mobility groups 114 that organize the storage objects 112 used by the application 116 in a manner such that the intricate details associated with how the storage objects 112 are moved or copied are abstracted from the user.

The multi-cloud management tool 102 communicates with each cloud 110 through a network, such as the Internet, and may be embodied as instructions stored in a memory and executed by one or more IHSs 200, such as the IHS 200 described herein below. Each cloud 110 may be managed and operated by a service provider on behalf of the one or more organizations. For example, cloud 110*a* may be managed and operated by the service provider on behalf of a first organization, while cloud 110*b* may be managed and operated by the service provider on behalf of a second, different organization. In some cases, more than one cloud 110 may be managed and operated on behalf of a single organization. Each cloud 110 may include a public cloud platform (e.g., AMAZON WEB SERVICES, MICROSOFT AZURE, GOOGLE CLOUD PLATFORM, etc.), or privately held cloud platform. For example, a private cloud may be internally managed by, or on behalf of, the enterprise (e.g., organization, company, group, person, etc.) that deploys it.

The data center 106 and each cloud 110 is supported by infrastructure in the form of one or more servers 104 or other type of computer, storage device, or other processing platform element. For example, the server 104*a* configured in the op data center 106 may include at least one POWERSTORE storage server, server 104*b* configured in cloud 110*a* may include at least one POWERFLEX storage server, while server 104*c* configured in cloud 110*b* may include at least one POWERSCALE storage server provided by DELL TECHNOLOGIES.

Generally speaking, the mobility group 114 is a record indicating a grouping of storage objects 112 on the servers 104. (e.g., storage endpoints). These storage objects 112 could be block volumes, a write-consistent collection of block volumes (Consistency Group), directories with subdirectories and/or files on a filesystem, or storage objects. Users create and manage mobility using a mobility group 114. A mobility group 114 could take one of two roles depending on its function in the data mobility orchestration across servers 104. A first role would be a source mobility group 114 that indicates a collection of storage objects 112 on servers 104, which is the source of a data mobility data copy operation. The source mobility group 114 could include homogeneous entities (e.g., all block volumes only), or heterogeneous entities (e.g., a combination of block volumes and a directory on a filesystem). Users can choose the membership of the source mobility group 114. Additionally, the storage objects 112 in a source mobility group 114 could exist in a single data center 106 or cloud 110, or they could exist in a combination of data center 106 and/or cloud 110. A target mobility group 114 is a record indicating a collection of storage objects 112 on servers 104 that is the target of a data mobility data copy operation from the source mobility group 114. Data copies on the target mobility group 114 can then be repurposed by users via an appropriate storage protocol (e.g., block storage, file storage, object storage, etc.) as will be described in detail herein below.

An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

Figure 2:
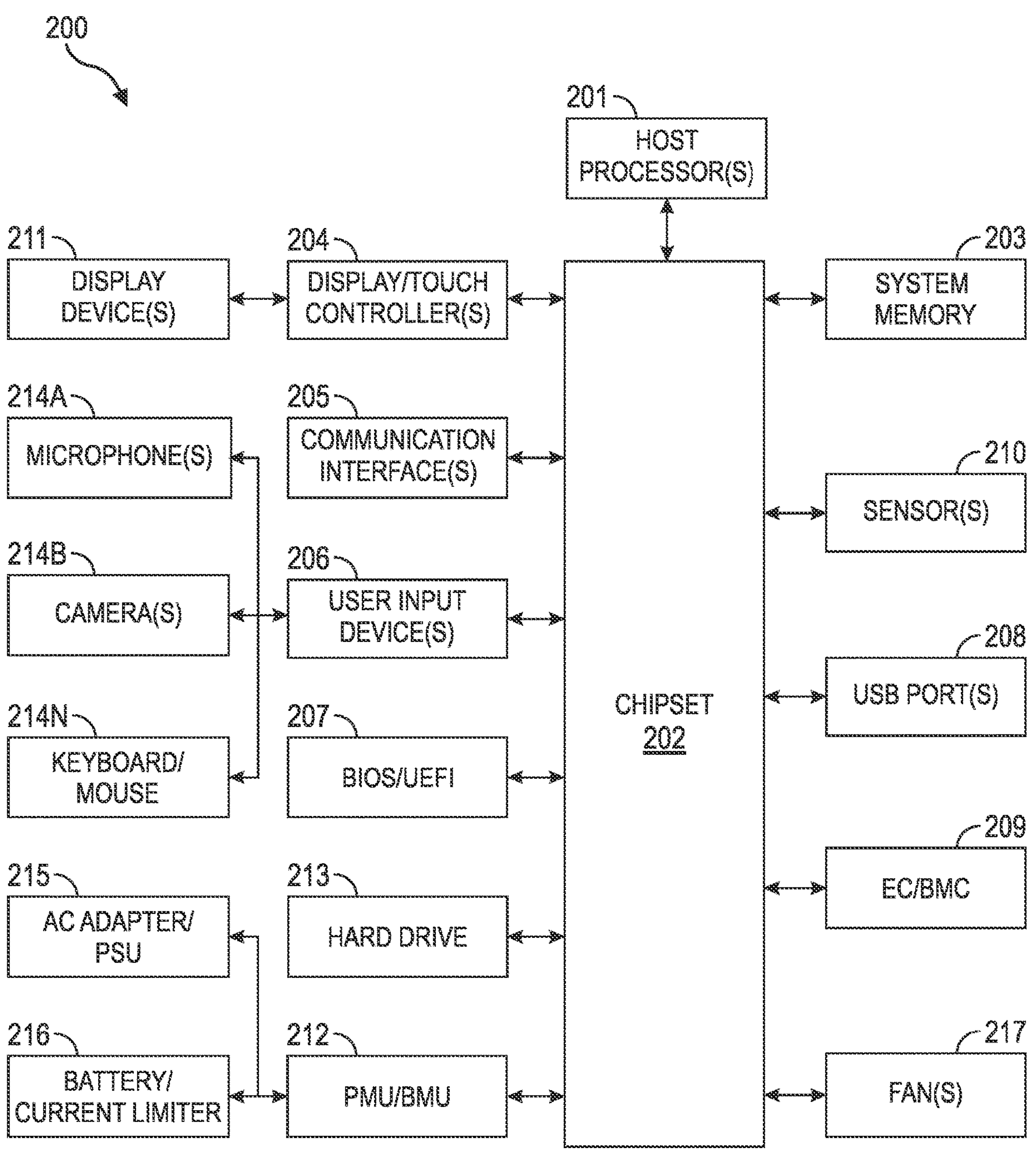
FIG. 2 is a block diagram of components of an IHS, of which one or more may be used to implement embodiments of the multi-cloud mobility grouping system of FIG. 1.

FIG. 2 is a block diagram of components of an IHS 200, of which one or more may be used to implement embodiments of the multi-cloud mobility grouping of FIG. 1. As depicted, IHS 200 includes host processor(s) 201. In various embodiments, IHS 200 may be a single-processor system, a multi-processor system including two or more processors, and/or a heterogeneous computing platform. Host processor(s) 201 may include any processor capable of executing program instructions, such as a PENTIUM processor, or any general-purpose or embedded processor implementing any of a variety of Instruction Set Architectures (ISAs), such as an x86 or a Reduced Instruction Set Computer (RISC) ISA (e.g., POWERPC, ARM, SPARC, MIPS, etc.).

IHS 200 includes chipset 202 coupled to host processor(s) 201. Chipset 202 may provide host processor(s) 201 with access to several resources. In some cases, chipset 202 may utilize a QuickPath Interconnect (QPI) bus to communicate with host processor(s) 201.

Chipset 202 may also be coupled to communication interface(s) 205 to enable communications between IHS 200 and various wired and/or wireless networks, such as Ethernet, WiFi, BLUETOOTH (BT), cellular or mobile networks (e.g., Code-Division Multiple Access or "CDMA," Time-Division Multiple Access or "TDMA," Long-Term Evolution or "LTE," etc.), satellite networks, or the like.

Communication interface(s) 205 may also be used to communicate with certain peripherals devices (e.g., BT speakers, microphones, headsets, etc.). Moreover, communication interface(s) 205 may be coupled to chipset 202 via a Peripheral Component Interconnect Express (PCIe) bus, or the like.

Chipset 202 may be coupled to display/touch controller(s) 204, which may include one or more Graphics Processor Units (GPUs) on a graphics bus, such as an Accelerated Graphics Port (AGP) or PCIe bus. As shown, display/touch controller(s) 204 provide video or display signals to one or more display device(s) 211.

Display device(s) 211 may include Liquid Crystal Display (LCD), Light Emitting Diode (LED), organic LED (OLED), or other thin film display technologies. Display device(s) 211 may include a plurality of pixels arranged in a matrix, configured to display visual information, such as text, two-dimensional images, video, three-dimensional images, etc. In some cases, display device(s) 211 may be provided as a single continuous display, or as two or more discrete displays.

Chipset 202 may provide host processor(s) 201 and/or display/touch controller(s) 204 with access to system memory 203. In various embodiments, system memory 203 may be implemented using any suitable memory technology, such as static RAM (SRAM), dynamic RAM (DRAM) or magnetic disks, or any nonvolatile/Flash-type memory, such as a solid-state drive (SSD) or the like.

Chipset 202 may also provide host processor(s) 201 with access to one or more Universal Serial Bus (USB) ports 208, to which one or more peripheral devices may be coupled (e.g., integrated or external webcams, microphones, speakers, etc.).

Chipset 202 may further provide host processor(s) 201 with access to one or more hard disk drives, solid-state drives, optical drives, or other removable-media drives 213.

Chipset 202 may also provide access to one or more user input devices 206, for example, using a super I/O controller or the like. Examples of user input devices 206 may include, but are not limited to, microphone(s) 214A, camera(s) 214B, and keyboard/mouse 214N. Other user input devices 206 may include a touchpad, trackpad, stylus or active pen, totem, etc.

Each user input devices 206 may include a respective controller (e.g., a touchpad may have its own touchpad controller) that interfaces with chipset 202 through a wired or wireless connection (e.g., via communication interfaces(s) 205). In some cases, chipset 202 may also provide access to one or more user output devices (e.g., video projectors, paper printers, 3D printers, loudspeakers, audio headsets, Virtual/Augmented Reality (VR/AR) devices, etc.). In certain embodiments, chipset 202 may further provide an interface for communications with hardware sensors 210.

Sensors 210 may be disposed on or within the chassis of IHS 200, or otherwise coupled to IHS 200, and may include, but are not limited to: electric, magnetic, radio, optical (e.g., camera, webcam, etc.), infrared, thermal (e.g., thermistors etc.), force, pressure, acoustic (e.g., microphone), ultrasonic, proximity, position, deformation, bending, direction, movement, velocity, rotation, gyroscope, Inertial Measurement Unit (IMU), and/or acceleration sensor(s).

The Unified Extensible Firmware Interface (UEFI) was designed as a successor to BIOS. As a result, many modern IHSs utilize UEFI in addition to or instead of a BIOS. As used herein, BIOS 207 is intended to also encompass a UEFI component.

Embedded Controller (EC) or Baseboard Management Controller (BMC) 209 is operational from the very start of each IHS power reset and handles various tasks not ordinarily handled by host processor(s) 201. Examples of these operations may include, but are not limited to: receiving and processing signals from a keyboard or touchpad, as well as other buttons and switches (e.g., power button, laptop lid switch, etc.), receiving and processing thermal measurements (e.g., performing fan control, CPU and GPU throttling, and emergency shutdown), controlling indicator LEDs (e.g., caps lock, scroll lock, number lock, battery, power, wireless LAN, sleep, etc.), managing PMU/BMU 212, alternating current (AC) adapter/Power Supply Unit (PSU) 215 and/or battery/current limiter 216, allowing remote diagnostics and remediation over network(s) 104, etc. For example, EC/BMC 209 may implement operations for interfacing with power adapter/PSU 215 in managing power for IHS

200. Such operations may be performed to determine the power status of IHS 200, such as whether IHS 200 is operating from AC adapter/PSU 215 and/or battery 216.

Firmware instructions utilized by EC/BMC 209 may also be used to provide various core operations of IHS 200, such as power management and management of certain modes of IHS 200 (e.g., turbo modes, maximum operating clock frequencies of certain components, etc.). In addition, EC/BMC 209 may implement operations for detecting certain changes to the physical configuration or posture of IHS 200. For instance, when IHS 200 is embodied as a 2-in-1 laptop/tablet form factor, EC/BMC 209 may receive inputs from a lid position or hinge angle sensor 210, and it may use those inputs to determine: whether the two sides of IHS 200 have been latched together to a closed position or a tablet position, the magnitude of a hinge or lid angle, etc. In response to these changes, the EC may enable or disable certain features of IHS 200 (e.g., front or rear facing camera, etc.).

In some cases, EC/BMC 209 may be configured to identify any number of IHS postures, including, but not limited to: laptop, stand, tablet, tent, or book. For example, when display(s) 211 of IHS 200 is open with respect to a horizontal keyboard portion, and the keyboard is facing up, EC/BMC 209 may determine IHS 200 to be in a laptop posture. When display(s) 211 of IHS 200 is open with respect to the horizontal keyboard portion, but the keyboard is facing down (e.g., its keys are against the top surface of a table), EC/BMC 209 may determine IHS 200 to be in a stand posture.

When the back of display(s) 211 is closed against the back of the keyboard portion, EC/BMC 209 may determine IHS 200 to be in a tablet posture. When IHS 200 has two display(s) 211 open side-by-side, EC/BMC 209 may determine IHS 200 to be in a book posture. When IHS 200 has two displays open to form a triangular structure sitting on a horizontal surface, such that a hinge between the displays is at the top vertex of the triangle, EC/BMC 209 may determine IHS 200 to be in a tent posture. In some implementations, EC/BMC 209 may also determine if display(s) 211 of IHS 200 are in a landscape or portrait orientation. In some cases, EC/BMC 209 may be installed as a Trusted Execution Environment (TEE) component to the motherboard of IHS 200.

Additionally, or alternatively, EC/BMC 209 may be configured to calculate hashes or signatures that uniquely identify individual components of IHS 200. In such scenarios, EC/BMC 209 may calculate a hash value based on the configuration of a hardware and/or software component coupled to IHS 200. For instance, EC/BMC 209 may calculate a hash value based on all firmware and other code or settings stored in an onboard memory of a hardware component.

Hash values may be calculated as part of a trusted process of manufacturing IHS 200 and may be maintained in secure storage as a reference signature. EC/BMC 209 may later recalculate the hash value for a component, compare it against the reference hash value to determine if any modifications have been made to the component, thus indicating that the component has been compromised. In this manner, EC/BMC 209 may validate the integrity of hardware and software components installed in IHS 200.

In various embodiments, IHS 200 may be coupled to an external power source (e.g., AC outlet or mains) through an AC adapter/PSU 215. AC adapter/PSU 215 may include an adapter portion having a central unit (e.g., a power brick, wall charger, or the like) configured to draw power from an AC outlet via a first electrical cord, convert the AC power to direct current (DC) power, and provide DC power to IHS 200 via a second electrical cord.

Additionally, or alternatively, AC adapter/PSU 215 may include an internal or external power supply portion (e.g., a switching power supply, etc.) connected to the second electrical cord and configured to convert AC to DC. AC adapter/PSU 215 may also supply a standby voltage, so that most of IHS 200 can be powered off after preparing for hibernation or shutdown, and powered back on by an event (e.g., remotely via wake-on-LAN, etc.). In general, AC adapter/PSU 215 may have any specific power rating, measured in volts or watts, and any suitable connectors.

IHS 200 may also include internal or external battery 216. Battery 216 may include, for example, a Lithium-ion or Li-ion rechargeable device capable of storing energy sufficient to power IHS 200 for an amount of time, depending upon the IHS's workloads, environmental conditions, etc. In some cases, a battery pack may also contain temperature sensors, voltage regulator circuits, voltage taps, and/or charge-state monitors. For example, battery 216 may include a current limiter, or the like.

In some embodiments, battery 216 may be configured to detect overcurrent or undervoltage conditions using Limits Management Hardware (LMH). As used herein, the term "overcurrent" refers to a condition in an electrical circuit that arises when a normal load current is exceeded (e.g., overloads, short circuits, etc.). Conversely, the term "undervoltage" refers to a condition (e.g., "brownout") where the applied voltage drops to X % of rated voltage (e.g., 90%), or less, for a predetermined amount of time (e.g., 1 minute).

Power Management Unit (PMU) 212 governs power functions of IHS 200, including AC adapter/PSU 215 and battery 216. For example, PMU 212 may be configured to: monitor power connections and battery charges, charging batteries, control power to other components, devices, or ICs, shut down components when they are left idle, control sleep and power functions (On and Off), managing interfaces for built-in keypad and touchpads, regulate real-time clocks (RTCs), etc.

In some implementations, PMU 212 may include one or more Power Management Integrated Circuits (PMICs) configured to control the flow and direction or electrical power in IHS 200. Particularly, a PMIC may be configured to perform battery management, power source selection, voltage regulation, voltage supervision, undervoltage protection, power sequencing, and/or charging operations. It may also include a DC-to-DC converter to allow dynamic voltage scaling, or the like.

Figure 3:
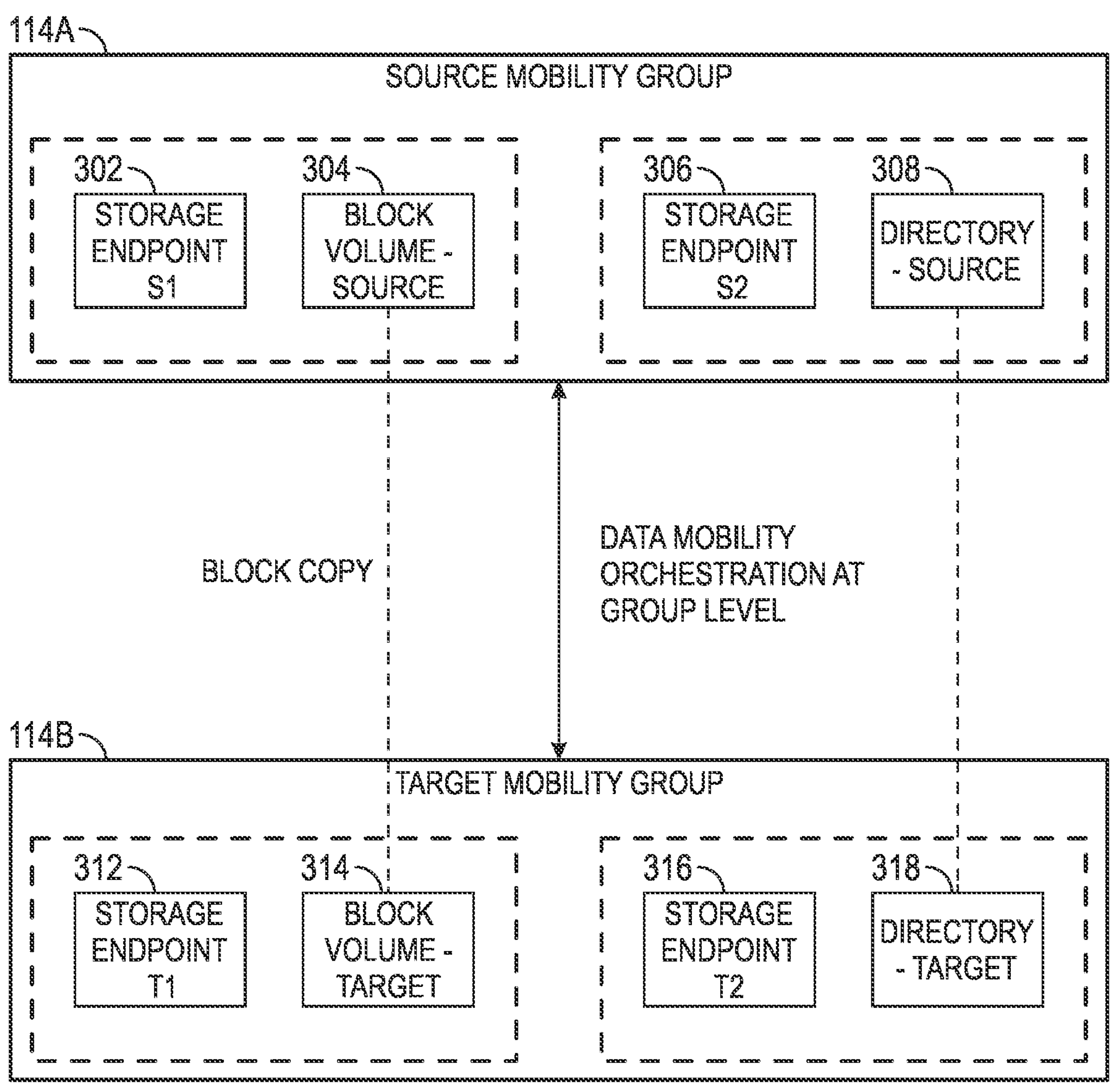
FIG. 3 illustrates an example source mobility group and target mobility group that may be used by the data mobility grouping system of FIG. 1 to orchestrate storage objects in a multi-cloud platform according to one embodiment of the present disclosure.

Additionally, or alternatively, PMU 212 may include a Battery Management Unit (BMU) (referred to collectively as "PMU/BMU 212"). AC adapter/PSU 215 may be removably coupled to a battery charge controller within PMU/BMU 212 to provide IHS 200 with a source of DC power from battery cells within battery 216 (e.g., a lithium ion (Li-ion) or nickel metal hydride (NiMH) battery pack including one or more rechargeable batteries). PMU/BMU 212 may include non-volatile memory and it may be configured to collect and store battery status, charging, and discharging information, and to provide that information to other IHS components, such as, for example devices within heterogeneous computing platform 300 (FIG. 3).

Examples of information collected and stored in a memory within PMU/BMU 212 may include, but are not limited to: operating conditions (e.g., battery operating conditions including battery state information such as battery current amplitude and/or current direction, battery voltage, battery charge cycles, battery state of charge, battery state of health, battery temperature, battery usage data such as charging and discharging data; and/or IHS operating conditions such as processor operating speed data, system power management and cooling system settings, state of "system present" pin signal), environmental or contextual information (e.g., such as ambient temperature, relative humidity, system geolocation measured by GPS or triangulation, time and date, etc.), and BMU events.

Examples of BMU events may include, but are not limited to acceleration or shock events, system transportation events, exposure to elevated temperature for extended time periods, high discharge current rate, combinations of battery voltage, battery current and/or battery temperature (e.g., elevated temperature event at full charge and/or high voltage causes more battery degradation than lower voltage), etc.

In some embodiments, power draw measurements may be conducted with control and monitoring of power supply via PMU/BMU 212. Power draw data may also be monitored with respect to individual components or devices of IHS 200. Whenever applicable, PMU/BMU 212 may administer the execution of a power policy, or the like.

IHS 200 may also include one or more fans 217 configured to cool down one or more components or devices of IHS 200 disposed inside a chassis, case, or housing. Fan(s) 217 may include any fan inside, or attached to, IHS 200 and used for active cooling. Fan(s) 217 may be used to draw cooler air into the case from the outside, expel warm air from inside, and/or move air across a heat sink to cool a particular IHS component. In various embodiments, both axial and sometimes centrifugal (blower/squirrel-cage) fans may be used.

In other embodiments, IHS 200 may not include all the components shown in FIG. 2. In other embodiments, IHS 200 may include other components in addition to those that are shown in FIG. 2. Furthermore, some components that are represented as separate components in FIG. 2 may instead be integrated with other components, such that all or a portion of the operations executed by the illustrated components may instead be executed by the integrated component.

For example, in various embodiments described herein, host processor(s) 201 and/or other components of IHS 200 (e.g., chipset 202, display/touch controller(s) 204, communication interface(s) 205, EC/BMC 209, etc.) may be replaced by discrete devices within a heterogeneous computing platform. As such, IHS 200 may assume different form factors including, but not limited to: servers, workstations, desktops, laptops, appliances, video game consoles, tablets, smartphones, etc.

FIG. 3 illustrates an example source mobility group 114*a* and target mobility group 114*b* that may be used by the data mobility grouping system 100 of FIG. 1 to orchestrate storage objects in a multi-cloud platform according to one embodiment of the present disclosure. The source mobility group 114*a* includes a first storage endpoint 302 associated with a block volume source 304, and a second storage endpoint 306 associated with a directory source 308. The target mobility group 114*b* includes a first storage endpoint 312 associated with a block volume source 314, and a second storage endpoint 316 associated with a directory target 318. Within this disclosure, a storage endpoint 302, 306, 312, 318 may refer to a specific location on a server 104 that is allocated for storing a storage object 112. To provide an example in which the storage object 112 is file storage, its storage endpoints 306, 316 would include a particular subdirectory on the server 104 where the storage object 112 is stored.

In this particular example source mobility group 114*a*, 114*b*, a source mobility group 114*a* includes a block volume 304 associated with storage endpoint 302 and a directory source 308 associated with Storage Endpoint 306. Note that the mobility group 114*a* involves different storage object types from different endpoints. The target mobility group 114*b* includes a block volume 314 and filesystem directory 318 corresponding one-for-one (1:1) to the source block volume 304 and directory source 308. These storage objects are hosted in endpoints 302 and 312 respectively.

The data mobility operation may be orchestrated and managed by the user at the mobility group level. The semantics of file or block mobility is abstracted from users so that they can focus on their application data and that data's placement. The source endpoints 302, 306 and target endpoints 312, 316 could exist on-premises system 104*a* or endpoints in a cloud 110. Depending on the nature of a copy and/or re-purposing of the target storage object 112 on the target side, users could choose certain data management features, such as a scheduled data copy, creating a consistent dataset across multiple block volumes on the target, merging data from multiple source directories into a target directory, and the like as they orchestrate their inter-group mobility operations. These data management features may be exposed off the Mobility Group. Additionally, groups can have dual roles. For example, target mobility group 114*b* can act as source for a copy to another mobility group 114.

To provide a particular use case scenario, an Information Technology Decision Maker (ITDM) of an enterprise 108 has deployed an application 116 that consumes block Storage (e.g., POWERFLEX block volumes) in the enterprise's on-premises environment 106. To support test, development, or data analytics, the ITDM would like to move data from the on-premises environment 106 to a cloud environment 110. The multi-cloud management tool 102 may detect some, most, or all the relevant volumes associated with the application 116 and group them automatically under a mobility group 114. If, due to the specific nature of the application 116, this is not possible then the ITDM may manually identify the storage objects 112 that the application 116 is consuming. Once the storage objects 112 associated with the application 116 have been identified, the multi-cloud management tool 102 may present the mobility group 114 to operate on. The ITDM then identifies the target in a cloud 110 (e.g. POWERFLEX deployed in an Amazon Web Services (AWS) cloud) and requests that the multi-cloud management tool 102 copy the storage objects 112 to the selected cloud 110. The ITDM operates at the mobility group 114 level while the multi-cloud management tool 102 manages the semantics of copying each of the individual storage objects 112 to the cloud 110. A copy of the storage objects 112 in the cloud 110 may be represented as a mobility group 114, and the ITDM can re-purpose the copy and mount to cloud-based compute environments. At all points, the ITDM operates on the abstraction of a mobility group 114, and is free from the worry of managing the specific semantics of managing separate storage objects 112.

To provide another use case scenario, an ITDM of the enterprise 108 has deployed another application 116 that consumes file Storage (e.g., POWERSCALE server) in the enterprise's on-premises environment 106. Data updates on the on-premises file system needs to be sent to a cloud 110 on a regular basis to allow their global team to create new golden copies of the latest data. The multi-cloud management tool 102 automatically detects most or all the relevant directories associated with the storage objects 112 (e.g., Network File System (NFS) exports, Server Message Block (SMB) shares, etc.) and groups them automatically under a mobility group 114. The multi-cloud management tool 102 then presents the ITDM with a mobility group 114 to operate on, and the ITDM identifies a suitable target in the cloud 110 (e.g. POWERSCALE server deployed in AZURE). Upon receiving user input from the ITDM, the multi-cloud management tool 102 copies the mobility group 114 to the cloud 110. The ITDM operates at the mobility group level, which the multi-cloud management tool 102 manages the copy semantics. In one embodiment, the multi-cloud management tool 102 could also copy from one-type to another (e.g. filesystem directory to objects in a S3 bucket). Following the copy operation, the ITDM can present the storage objects 112 in the cloud 110 to cloud-based applications. At all points, the ITDM operates on the abstraction of a mobility group 114 and is kept free from the semantics of managing separate volumes.

FIG. 4 illustrates an example mobility group representation 400 that may be generated by the multi-cloud management tool 102 according to one embodiment of the present disclosure. In this example, a mobility group 114 named “Application XYZ Group” is identified by its id “1234” references two storage objects 112, namely block volumes and a file directory. While the mobility group representation 400 only shows two storage objects 112, it should be appreciated that other mobility group representations may include references to any quantity of storage objects 112, such as only one storage object 112 or three or more storage objects 112. A user would access the mobility group representation 400 via the mobility group “id”, as the mobility group construct abstracts out all the internal procedures required for copying the block volume and file directory from the user.

An example procedure performed by the multi-cloud management tool 102 to use the mobility group representation 400 may include receiving user input to set up a copy policy that applies to the mobility group representation 400 as a whole. How this policy applies to each storage object 112 is abstracted from the user by the multi-cloud management tool 102. In one embodiment, the multi-cloud management tool 102 may also receive user input to pause, cancel, or resume a paused copy. The multi-cloud management tool 102 may be configured to handle such semantics across disparate servers in the multi-cloud environment. In another embodiment, the multi-cloud management tool 102 may re-purpose the copy for various use cases, such as exposing the copied storage objects 112 to another running instance of the application 116 where the copied storage objects 112 are located. The multi-cloud management tool 102 may also delete the source mobility group 114*a* or target mobility group 114*b* when mobility of the application 116 is no longer needed.

Embodiments of the present disclosure may provide an advantage over conventional techniques for mobility. For example, without a mobility group 114, the user would have to manage block storage, file storage, and object storage separately. Additionally, the user would need to know details associated with which storage systems and what storage objects are consumed by an application. This can become increasingly complicated when having to deal with multi-cloud, heterogeneous systems. The user would also need to know storage protocols and storage object type semantics (volume vs volume group vs directory vs export vs object vs share). The multi-cloud management tool 102 of the present disclosure provides a solution to this by identifying the underlying storage consumed by an application and represents the application storage as an abstract entity, namely a mobility group 114.

Another drawback of conventional mobility techniques is that with no abstraction, the user would need to know the nuances of what is required to create a point-in-time snapshot on the various storage systems (e.g., block storage is different from file storage, AWS is different from Azure and so on). The multi-cloud management tool 102 uses mobility groups 114 to abstract out most or all complexities. The user sets the policy on the mobility group 114 and the multi-cloud management tool 102 translates the policies in an appropriate way according to each storage system or cloud. Each storage system has its own nuances on copy management, often needing system specific experts to be involved in order to manage or troubleshoot. Note that many copy management solutions available today are often storage system specific and driven from the element manager, and as such, they cannot span system types or provide any abstraction therein. The multi-cloud management tool 102, using mobility groups 114, manages copy orchestration end-to-end, across most or all systems. The multi-cloud management tool 102 can also use mobility groups 114 to copy between homogeneous system (e.g., POWERFLEX to POWERFLEX) or heterogeneous system (e.g., POWERFLEX to POWERSTORE) and even across protocols (e.g., file storage to object storage). The multi-cloud management tool 102 may allow the user to operate on a single abstraction agnostic of system or protocol.

Regarding post-copy re-purpose, conventional mobility techniques have required that the user needs to know how to manage different protocols (e.g., NFS export vs SMB share vs LUN masking to a host, etc.). Operations will be different with the varying element managers and thus prone to errors. Additionally, the conventional element managers often assume intimate knowledge of the storage system internals, and often an application administrator needs a storage administrator to help out with this task. The multi-cloud management tool 102 solves this problem by abstraction; for example, the multi-cloud management tool 102 may handle any LUN masking or NFS export creation logic.

Figure 5:
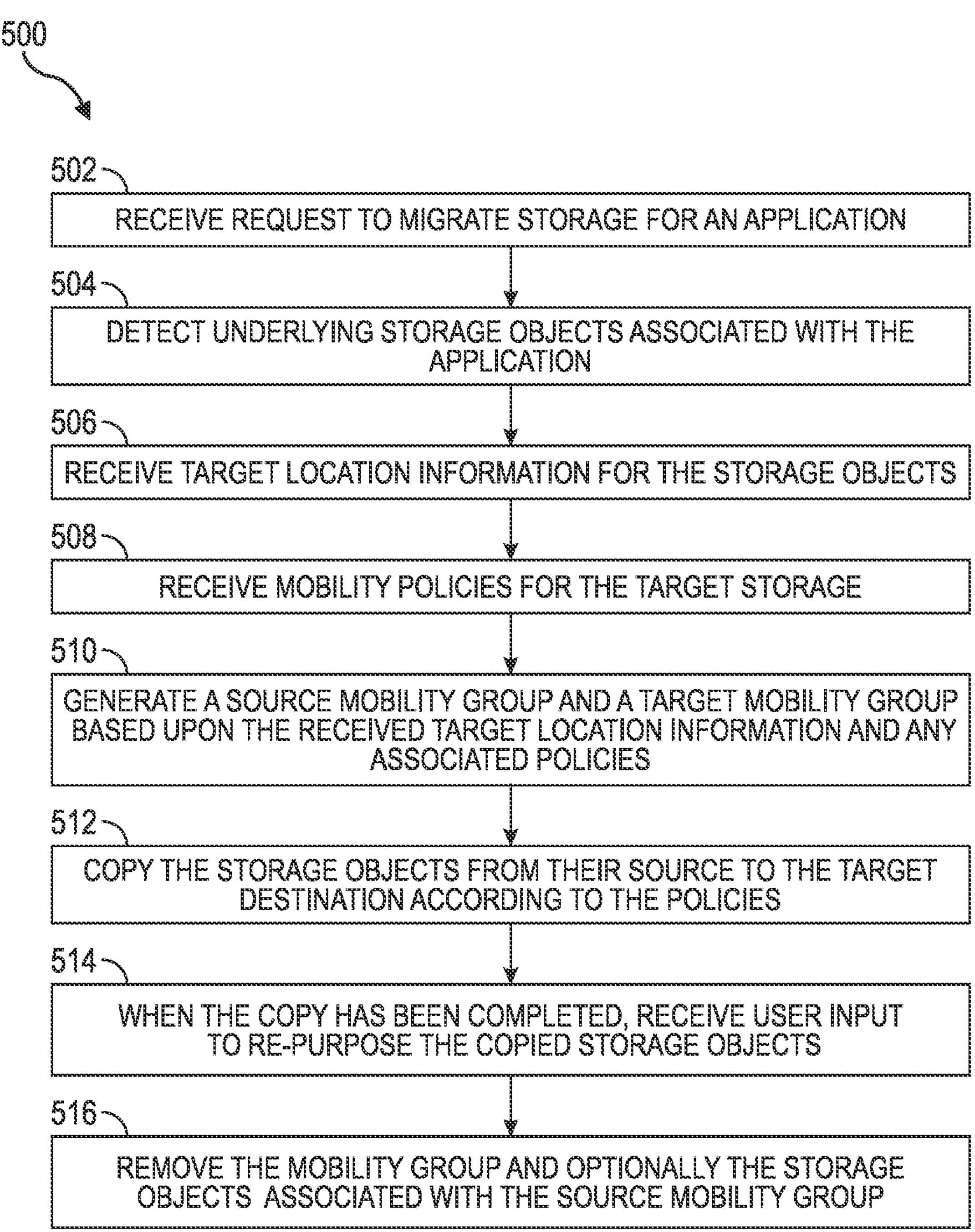
FIG. 5 illustrates an example mobility grouping method that may be performed by the mobility grouping system to orchestrate the migration of multiple storage objects using mobility groups according to one embodiment of the present disclosure.

FIG. 5 illustrates an example mobility grouping method 500 that may be performed by the mobility grouping system 100 to orchestrate the migration of multiple storage objects using mobility groups according to one embodiment of the present disclosure. The method 500 may be performed at any time that storage objects 112 associated with an application 116 are to be copied from one storage system to another in a multi-cloud platform. Additionally or alternatively, the data mobility grouping method 100 may be performed at least in part, by the multi-cloud management tool 102 as described herein above with reference to FIG. 1.

Initially at step 502, the multi-cloud management tool 102 receives a request to migrate one or more storage objects 112 consumed by an application 116. For example, the request may be received manually via user input by a user desiring to migrate storage objects 112 from one storage system (e.g., cloud storage 110, on-premises storage 106, etc.) to another. Thereafter at step 504, the multi-cloud management tool 102 detects any underlying storage objects 112 associated with the application 116. The multi-cloud management tool 102 may detect the underlying storage objects 112 in any suitable manner. In one embodiment, the multi-cloud management tool 102 may identify any source or destination addresses of RPC calls made by the application 116. In another embodiment, the multi-cloud management tool 102 may interrogate the application 116 directly to identify the storage objects 112 that it is consuming.

At step 506, the multi-cloud management tool 102 receives a target location for the storage objects 112. The target location may be any server or other type of computing system in a multi-cloud platform, such as cloud 110 storage, on-premises storage 106, and the like. The multi-cloud management tool 102 then receives mobility policies for the target storage at step 508. The policies may include any conditions or events, such as how frequently to move the data, events that would trigger migration of the storage objects 112 (e.g., power failure, number of failure/retries, error recovery, loss of communication, etc.). At step 510, the multi-cloud management tool 102 generates a source mobility group 114*a* and a target mobility group 114*b* based upon the received target location and any associated policies.

At step 512, the multi-cloud management tool 102 copies the storage objects 112 from their source to the target destination according to the policies. For example, the multi-cloud management tool 102 may commence copying of the storage objects 112 based on a policy that specifies that the copy procedure is to be started at 2:00 am. As another example, the multi-cloud management tool 102 may commence copying of the storage objects 112 based on a policy that specifies copying only a certain portion of a storage object 112 that has changed since last copy operation. It may be important to note that the underlying mechanism of copy, including the storage protocol specifics and the nuances of block/file/object storage are hidden under the mobility group 114. Events, such as failure-retries and error recovery during copy are managed by the multi-cloud management tool 102 using policies stored in the mobility group 114.

In one embodiment, the multi-cloud management tool 102 may determine a storage type, such as block storage, file storage, object storage, or a particular cloud platform (e.g., AWS, AZURE, etc.) of the source server 104 prior to copying the storage objects, and generate a snapshot of the storage objects according to the determined storage type.

At step 514, when the copy has been completed, the multi-cloud management tool 102 may receive user input to re-purpose the copied storage objects 112. For example, the multi-cloud management tool 102 may receive user input to expose the copied storage objects 112 to certain applications, such as application 116. The semantics of re-purpose varies across storage systems and object types. Since the user is operating at the mobility group level, they are abstracted from this and can focus on getting data available for their applications to consume. Thereafter at step 516, further migration is no longer needed, thus the multi-cloud management tool 102 receives user input to remove the mobility group 112 and optionally the storage objects 112 associated with the source mobility group 114*a*.

The steps of the aforedescribed process may be performed each time that the storage objects 112 associated with a particular application are to be copied to another storage system in a multi-cloud platform. Nevertheless, when use of the data mobility grouping method 100 is no longer needed or desired, the process ends.

Although FIG. 5 describes an example method 500 that may be performed to orchestrate the migration of multiple storage objects using mobility groups, the features of the method 500 may be embodied in other specific forms without deviating from the spirit and scope of the present disclosure. For example, the method 500 may perform additional, fewer, or different operations than those described in the present examples. For another example, the method 500 may be performed in a sequence of steps different from that described above. As yet another example, certain steps of the method 500 may be performed by other components than the multi-cloud management tool 102 described herein above.

In accordance with the foregoing, embodiments of the present systems and methods provide secure temporary privileged access to nodes in a cluster. To implement various operations described herein, computer program code (i.e., program instructions for carrying out these operations) may be written in any combination of one or more programming languages, including an object-oriented programming language such as Java, Smalltalk, Python, C++, or the like, conventional procedural programming languages, such as the "C" programming language or similar programming languages, or any of machine learning software. These program instructions may also be stored in a computer readable storage medium that can direct a computer system, other programmable data processing apparatus, controller, or other device to operate in a particular manner, such that the instructions stored in the computer readable medium produce an article of manufacture including instructions which implement the operations specified in the block diagram block or blocks.

Program instructions may also be loaded onto a computer, other programmable data processing apparatus, controller, or other device to cause a series of operations to be performed on the computer, or other programmable apparatus or devices, to produce a computer implemented process such that the instructions upon execution provide processes for implementing the operations specified in the block diagram block or blocks.

Modules implemented in software for execution by various types of processors may, for instance, include one or more physical or logical blocks of computer instructions, which may, for instance, be organized as an object or procedure. Nevertheless, the executables of an identified module need not be physically located together but may include disparate instructions stored in different locations which, when joined logically together, include the module and achieve the stated purpose for the module. Indeed, a module of executable code may be a single instruction, or many instructions, and may even be distributed over several different code segments, among different programs, and across several memory devices.

Similarly, operational data may be identified and illustrated herein within modules and may be embodied in any suitable form and organized within any suitable type of data structure. Operational data may be collected as a single data set or may be distributed over different locations including over different storage devices.

Reference is made herein to "configuring" a device or a device "configured to" perform some operation(s). This may include selecting predefined logic blocks and logically associating them. It may also include programming computer software-based logic of a retrofit control device, wiring discrete hardware components, or a combination thereof. Such configured devices are physically designed to perform the specified operation(s).

Various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs.

As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:

1. An Information Handling System (IHS) comprising:
- a multi-cloud platform comprising first and second clouds each supported by first and second servers, respectively; and
- at least one memory coupled to at least one processor, the at least one memory having program instructions stored thereon that, upon execution by the at least one processor, cause the at least one processor to:
  - receive a request to copy data consumed by an application from a first server to a second server;
  - determine one or more source storage objects on the first server that store the data;
  - determine a storage type of the second server, wherein the first and second servers are heterogeneous relative to one another;
  - generate a mobility group that includes information associated with a first location of the source storage objects and a second location of the second server;
  - copy the storage objects from the first server to the second server according to the information included in the mobility group; and
  - convert the storage objects to the storage type of the second server as they are being copied.

2. The IHS of claim 1, wherein the storage type comprises at least one of block storage, file storage, object storage, and a particular cloud platform.

3. The IHS of claim 1, wherein the program instructions, upon execution, further cause the IHS to:
- determine a storage type of the second server, wherein the first and second servers are homogeneous relative to one another; and
- copy the storage objects to the second server in the same storage type as the first server.

4. The IHS of claim 1, wherein the program instructions, upon execution, further cause the IHS to
- receive one or more policies associated with how and when the storage objects are to be copied;
- store the received policies in the mobility group; and
- copy the storage objects according to the policies stored in the mobility group.

5. The IHS of claim 1, wherein the program instructions, upon execution, further cause the IHS to:
- detect a storage protocol of the second server; and
- store the storage objects in the second server according to the detected storage protocol.

6. The IHS of claim 5, wherein the storage protocol comprises at least one of a Network File System (NFS) export, a Server Message Block (SMB) share, and a Logical Unit Number (LUN) masking to a host.

7. The IHS of claim 1, wherein the program instructions, upon execution, further cause IHS to
- determine a storage type of the first server; and
- prior to copying the storage objects, generate a snapshot of the storage objects according to the determined storage type.

8. The IHS of claim 1, wherein the program instructions, upon execution, further cause the IHS to
- determine a storage type of the second server;
- receive user input to perform at least one of pause, cancel, or resume a paused copy operation; and
- perform the at least one pause, cancel, or resume the paused copy operation according to the determined storage type.

9. A data mobility grouping method comprising:
- receiving a request to copy data consumed by an application from a first server to a second server of a multi-cloud platform;
- determining one or more source storage objects on the first server that store the data;
- determining a storage type of the second server, wherein the first and second servers are heterogeneous relative to one another;
- generating a mobility group that includes information associated with a first location of the source storage objects and a second location of the second server;
- copying the storage objects from the first server to the second server according to the information included in the mobility group; and
- converting the storage objects to the storage type of the second server as they are being copied.

10. The data mobility grouping method of claim 9, wherein the storage type comprises at least one of block storage, file storage, object storage, and a particular cloud platform.

11. The data mobility grouping method of claim 9, further comprising:
- determining a storage type of the second server, wherein the first and second servers are homogeneous relative to one another; and
- copying the storage objects to the second server in the same storage type as the first server.

12. The data mobility grouping method of claim 9, further comprising:

receiving one or more policies associated with how and when the storage objects are to be copied;

storing the received policies in the mobility group; and copying the storage objects according to the policies stored in the mobility group.

13. The data mobility grouping method of claim 9, further comprising:

detecting a storage protocol of the second server; and storing the storage objects in the second server according to the detected storage protocol;

wherein the storage protocol comprises at least one of a Network File System (NFS) export, a Server Message Block (SMB) share, and a Logical Unit Number (LUN) masking to a host.

14. The data mobility grouping method of claim 9, further comprising:

determining a storage type of the first server; and prior to copying the storage objects, generating a snapshot of the storage objects according to the determined storage type.

15. The data mobility grouping method of claim 9, further comprising:

determining a storage type of the second server;

receiving user input to perform at least one of pause, cancel, or resume a paused copy operation; and performing the at least one pause, cancel, or resume the paused copy operation according to the determined storage type.

16. A computer program product comprising a non-transitory computer-readable storage medium having program instructions stored thereon that, upon execution by an Information Handling System (IHS), cause the IHS to:

receive a request to copy data consumed by an application from a first server to a second server of a multi-cloud platform;

determine one or more source storage objects on the first server that store the data;

determine a storage type of the second server, wherein the first and second servers are heterogeneous relative to one another;

generate a mobility group that includes information associated with a first location of the source storage objects and a second location of the second server;

copy the storage objects from the first server to the second server according to the information included in the mobility group; and convert the storage objects to the storage type of the second server as they are being copied.

17. The computer program product of claim 16, wherein the storage type comprises at least one of block storage, file storage, object storage, and a particular cloud platform.

18. The computer program product of claim 16, wherein the program instructions, upon execution, further cause the IHS to:

determine a storage type of the second server, wherein the first and second servers are homogeneous relative to one another; and copy the storage objects to the second server in the same storage type as the first server.

19. The computer program product of claim 16, wherein the program instructions, upon execution, further cause the IHS to:

detect a storage protocol of the second server; and store the storage objects in the second server according to the detected storage protocol.

* * * * *